(12) United States Patent
Nomura et al.

(10) Patent No.: US 9,527,968 B2
(45) Date of Patent: Dec. 27, 2016

(54) RUBBER WET MASTER BATCH PRODUCING METHOD, RUBBER WET MASTER BATCH, AND RUBBER COMPOSITION CONTAINING RUBBER WET MASTER BATCH

(71) Applicant: TOYO TIRE & RUBBER CO., LTD., Osaka-shi, Osaka (JP)

(72) Inventors: Kenji Nomura, Osaka (JP); Takashi Miyasaka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 55 days.

(21) Appl. No.: 14/421,225

(22) PCT Filed: Jun. 18, 2013

(86) PCT No.: PCT/JP2013/066656
§ 371 (c)(1),
(2) Date: Feb. 12, 2015

(87) PCT Pub. No.: WO2014/073234
PCT Pub. Date: May 15, 2014

(65) Prior Publication Data
US 2015/0247011 A1    Sep. 3, 2015

(30) Foreign Application Priority Data

Nov. 8, 2012 (JP) .................................. 2012-246398

(51) Int. Cl.
C08J 3/22      (2006.01)
B29B 13/06    (2006.01)
(Continued)

(52) U.S. Cl.
CPC ................ *C08J 3/226* (2013.01); *B29B 13/06* (2013.01); *B29B 15/04* (2013.01); *C08J 3/18* (2013.01);
(Continued)

(58) Field of Classification Search
None
See application file for complete search history.

(56) References Cited

U.S. PATENT DOCUMENTS 5,679,456 A    10/1997  Sakai et al.
5,824,410 A    10/1998  Sakai et al.
(Continued)

FOREIGN PATENT DOCUMENTS

CN    102414269 A    4/2012
CN    102765207 A    11/2012
(Continued)

OTHER PUBLICATIONS

Notification of Transmittal of Translation of the International Preliminary Report on Patentability (Form PCT/IB/338) of Application No. PCT/JP2013/066656 mailed May 21, 2015 with Forms PCT/IB/373 and PCT/ISA/237 (English translation) (6 pages).
(Continued)

*Primary Examiner* — Richard A Huhn
(74) *Attorney, Agent, or Firm* — Westerman, Hattori, Daniels & Adrian, LLP (57) ABSTRACT

A method for producing a rubber wet master batch contains a coagulating step of mixing a slurry solution containing the filler and the dispersing solvent with the rubber latex solution, and coagulating the mixture, thereby producing a filler-containing rubber coagulation, and a heating step of using a uniaxial extruder to heat the filler-containing rubber coagulation to a temperature of 180 to 200 C, thereby dehydrating, drying and plasticizing the filler-containing
(Continued)

rubber coagulation through a single step. The uniaxial extruder is an extruder having a screw, and an outer cylinder having an inner wall surface in which a slit is formed to be extended along the longitudinal direction of the outer cylinder (screw axial direction); and at least one portion of the inner wall surface of the outer cylinder is subjected to blasting treatment.

2 Claims, 3 Drawing Sheets (51) Int. Cl.
*B29B 15/04* (2006.01)
*C08J 3/20* (2006.01)
*C08J 3/18* (2006.01)
*C08K 3/00* (2006.01)
*C08K 3/04* (2006.01)
*C08L 7/02* (2006.01)
*C08C 1/14* (2006.01)
*B29C 47/78* (2006.01)
*B01F 3/22* (2006.01)
*B01F 7/08* (2006.01)
*B29K 105/00* (2006.01)
*B29K 21/00* (2006.01)
*B29C 47/00* (2006.01)
*B29C 47/66* (2006.01)

(52) U.S. Cl.
CPC .............. *C08J 3/203* (2013.01); *C08K 3/0033* (2013.01); *C08K 3/04* (2013.01); *C08L 7/02* (2013.01); *B01F 3/223* (2013.01); *B01F 3/2284* (2013.01); *B01F 7/08* (2013.01); *B01L 2200/12* (2013.01); *B01L 2300/16* (2013.01); *B29C 47/0004* (2013.01); *B29C 47/0009* (2013.01); *B29C 47/661* (2013.01); *B29C 47/666* (2013.01); *B29C 47/78* (2013.01); *B29K 2021/00* (2013.01); *B29K 2105/0064* (2013.01); *C08C 1/14* (2013.01); *C08J 3/22* (2013.01); *C08J 2307/02* (2013.01); *C08J 2321/02* (2013.01); *C08L 2205/02* (2013.01)

(56) References Cited

U.S. PATENT DOCUMENTS

| 6,060,010 A | 5/2000 | Sakai et al. |
| 6,428,728 B1 | 8/2002 | Sakai et al. |
| 2010/0062156 A1 | 3/2010 | Kurth et al. |
| 2010/0202950 A1 | 8/2010 | Neverov et al. |
| 2011/0021664 A1 | 1/2011 | Wang et al. |
| 2012/0065325 A1 | 3/2012 | Nakayama |

FOREIGN PATENT DOCUMENTS

| JP | 48-99282 A | 12/1973 |
| JP | 61-120803 A | 6/1986 |
| JP | 7-80834 A | 3/1995 |
| JP | 2006-348237 A | 12/2006 |
| JP | 2010-65126 A | 3/2010 |
| JP | 4505038 B1 | 7/2010 |
| JP | 4527800 B1 | 8/2010 |
| JP | 2011-511148 A | 4/2011 |
| JP | 2012-131943 A | 7/2012 |

OTHER PUBLICATIONS

Office Action dated Apr. 8, 2016, issued in Japanese Patent Application No. 2012-246398, with English translation. (5 pages).
International Search Report dated Sep. 24, 2013, issued in corresponding application No. PCT/JP2013/066656.
Chinese Office Action dated Dec. 7, 2015, issued in counterpart Chinese Patent Application No. 201380042856.9, with English translation. (12 pages).

RUBBER WET MASTER BATCH PRODUCING METHOD, RUBBER WET MASTER BATCH, AND RUBBER COMPOSITION CONTAINING RUBBER WET MASTER BATCH

TECHNICAL FIELD

The present invention relates to a method for producing a rubber wet master batch obtained using at least a filler, a dispersing solvent and a rubber latex solution as raw materials, a rubber wet master batch, and a rubber composition containing the rubber wet master batch, in particular, to a method for producing a rubber wet master batch which is restrained from being rubber-degraded and is excellent in elongation at breaking and tearing resistance, a rubber wet master batch produced by the method, and a rubber composition containing the rubber wet master batch.

BACKGROUND ART

It has been hitherto known in the rubber industry that when a rubber composition containing a filler such as carbon black is produced, a rubber wet master batch is used to improve the processability of the composition, or the dispersibility of the filler. This is a technique of mixing the filler and a dispersing solvent with each other at a predetermined ratio in advance, dispersing the filler in the dispersing solvent by mechanical force, mixing the resultant filler-containing slurry solution with a rubber latex solution in a liquid phase, adding a coagulator such as an acid thereto to prepare a coagulation, recovering the coagulation, and then drying the recovered coagulation. The use of the rubber wet master batch gives a rubber composition more excellent in the dispersibility of the filler therein and more excellent in rubber physical properties such as processability and reinforceability than the use of a rubber dry master batch obtained by mixing a filler with a rubber in a solid phase. The use of such a rubber composition as a raw material makes it possible to produce a rubber product such as a pneumatic tire decreased in rolling resistance and excellent in fatigue resistance.

In the above-mentioned rubber wet master batch producing method, a method for removing water originating from the dispersing solvent and the rubber latex solution, from the filler-containing rubber coagulation obtained after the coagulation step is, for example, a method of performing solid-liquid separation by filtration or centrifugation, and then using any mixer to knead the filler-containing rubber coagulation while heating, thereby performing dehydration. In this dehydrating method, the water content in the rubber wet master batch obtained after dehydration can be made lower as the number of steps including dehydrating, drying and plasticizing steps is made larger, or the heating temperature in kneading is made higher. However, as the number of the steps including the dehydrating, drying and plasticizing steps, or the heat quantity and/or mechanical energy applied in dehydrating is increased, the resultant rubber wet master batch undergoes cleavage of polymer molecular chains thereof, or the like, so that the rubber composition to be finally obtained may be deteriorated in vulcanized rubber characteristics.

Patent Document 1 listed below describes a method for producing a rubber-chemical-containing master batch, characterized by using a biaxial extruder as a first kneader to dry and knead a rubber wet master batch containing a rubber component and a filler, and then using a Banbury mixer as a second kneader to mix a rubber chemical with the master batch. However, in this producing method, mechanical energy given to the rubber wet master batch is large since this rubber wet master batch is produced by drying and kneading the filler-containing rubber coagulation, using the biaxial extruder. Thus, the rubber component therein tends to be degraded. Accordingly, the vulcanized rubber to be finally obtained tends to be deteriorated in tearing resistance, and stress characteristics at a high strain region of the rubber.

Patent Document 2 listed below describes a method for producing an elastomer composite material, including performing the step of masticating a rubber coagulation obtained after a dehydrating step while a mechanical energy of at least about 0.3 MJ/kg (about 249 W/kg) is given to the coagulation; and subsequently performing an additional masticating step of masticating the coagulation while a mechanical energy of about 0.9 MJ/kg (about 83 W/kg) is given to the coagulation. However, also in this producing method, the mechanical energy given to the rubber wet master batch is large so that the rubber component therein tends to be degraded. Furthermore, the dehydrating and drying steps are performed several times to intensify the tendency that the degradation of the rubber component is caused. Consequently, the vulcanized rubber to be finally obtained tends to be deteriorated in tearing resistance and stress characteristics at the high strain region.

PRIOR ART DOCUMENTS

Patent Documents

Patent Document 1: JP-A-2010-65126
Patent Document 2: JP-A-2011-511148

DISCLOSURE OF THE INVENTION

Problems to be Solved by the Invention

In light of the above-mentioned actual situation, the present invention has been made. An object thereof is to provide a method for producing a rubber wet master batch which is restrained from being rubber-degraded and is excellent in elongation at breaking and tearing resistance; a rubber wet master batch produced by the producing method; and a rubber composition containing the rubber wet master batch.

Means for Solving the Problems

The object can be attained by the present invention described in the following, namely, the present invention relates to a method for producing a rubber wet master batch obtained by using at least a filler, a dispersing solvent, and a rubber latex solution as raw materials, comprising: a coagulating step of mixing a slurry solution containing the filler and the dispersing solvent with the rubber latex solution, and coagulating the mixture, thereby producing a filler-containing rubber coagulation; and a heating step of using a uniaxial extruder to heat the filler-containing rubber coagulation to a temperature of 180 to 200° C., thereby dehydrating, drying and plasticizing the filler-containing rubber coagulation through a single step, wherein: the uniaxial extruder is an extruder having a screw, and an outer cylinder having an inner wall surface in which a slit is formed to be extended along the longitudinal direction of the outer cylinder (screw axial direction); and at least one portion of the inner wall surface is subjected to blasting treatment.

According to this producing method, a slurry solution containing a filler and a dispersing solvent is mixed with a rubber latex solution, and the mixture is coagulated to produce a filler-containing rubber coagulation (coagulating step). This coagulation is dehydrated, dried and plasticized through a single step (heating step). Accordingly, the number of steps for the heating is decreased from that in any conventional technique in which such dehydration, drying and plasticization are performed separately from one another. The decrease makes it possible to produce a rubber wet master batch which is restrained from being rubber-degraded and is excellent in elongation at breaking and tearing resistance. In this heating step, a uniaxial extruder is used to heat the filler-containing rubber coagulation to a temperature of 180 to 200° C. If the heating temperature is lower than 180° C., the filler-containing rubber coagulation is not sufficiently lowered in moisture content, so as to be high in viscosity when extruded. Thus, the coagulation may be insufficiently plasticized. By contrast, if the heating temperature is higher than 200° C., the resultant rubber wet master batch may be rubber-degraded by excessive thermal hysteresis.

In this producing method, as the uniaxial extruder, an extruder having a screw and an outer cylinder is used. The outer cylinder is characterized in that a slit is formed in an inner wall surface of the outer cylinder to be extended along the longitudinal direction of the outer cylinder (screw axial direction), and at least one portion of this outer-cylinder inner-wall-surface is subjected to blasting treatment. When the uniaxial extruder having this outer cylinder is used to perform the heating treatment, shearing force acts onto the filler-containing rubber coagulation between the screw and the blasted surface of the outer-cylinder inner-wall-surface having microscopic roughnesses (fine irregularities), so that the filler-containing rubber coagulation comes to receive the shearing force while being hooked on the fine irregularities. It is assumed that, as a result, the dehydration, the drying and the plasticization of the filler-containing rubber coagulation can be effectively performed through the single step. In this way, the dehydration, the drying and the plasticization are effectively performed. Thus, the producing method according to the present invention makes it possible not only to perform plural steps (dehydration, drying and plasticization) to be applied to the filler-containing rubber coagulation through the single step, and but also to make thermal and mechanical energies given to the filler-containing rubber coagulation lower than conventional techniques. As a result, a rubber wet master batch can be produced which is restrained from being rubber-degraded and is excellent in elongation at breaking and tearing resistance.

In this method for producing a rubber wet master batch, the blasted surface of the outer-cylinder inner-wall-surface preferably has a surface roughness (Ra) of 10 to 100 µm. According to this structure, the searing force acts between the blasted surface of the outer-cylinder inner-wall-surface, which has a favorable surface roughness, and the screw, so that the shearing force acts more effectively onto the filler-containing rubber coagulation. Accordingly, the thermal and mechanical energies given to the filler-containing rubber coagulation can be further decreased to further restrain the resultant rubber wet master batch from being rubber-degraded.

The present invention relates to a rubber wet master batch produced by the producing method according to any of the afore-mentioned paragraphs, in particular, to a rubber composition containing the rubber wet master batch. A vulcanized rubber obtained by vulcanizing the rubber wet master batch and the rubber composition is restrained from being rubber-degraded, and is excellent in elongation at breaking and tearing resistance. The rubber wet master batch preferably has a void volume proportion of 2 to 15% from the viewpoint of effects on the rubber wet master batch at the time of handling and kneading the master batch. The "void volume proportion of the rubber wet master batch" can be calculated in accordance with the following equation:

(Void volume proportion (%))=100×((actually measured volume of rubber wet master batch)−(theoretical rubber wet master batch)/(actually measured volume of rubber wet master batch) provided that:

(theoretical rubber wet master batch volume)= (weight of rubber wet master batch)/(theoretical rubber wet master batch specific gravity).

MODE FOR CARRYING OUT THE INVENTION

The method for producing a rubber wet master batch according to the present invention has at least a coagulating step and a heating step. Hereinafter, each of the steps will be described.

(Coagulating Step)

In the coagulating step, a slurry solution containing a filler and a dispersing solvent is mixed with a rubber latex solution, and the mixture is coagulated to produce a filler-containing rubber coagulation. It is particularly preferred that the coagulating step has step (I) in which when the filler is dispersed in the dispersing solvent, at least one portion of the rubber latex solution is added, thereby producing a slurry solution containing the filler to which rubber latex particles adhere, step (II) in which the slurry solution is mixed with the remnant of the rubber latex solution to produce a rubber latex solution containing this filler to which rubber latex particles adhere, and step (III) in which the rubber latex solution containing the filler, to which rubber latex particles adhere, is coagulated to produce a filler-containing rubber coagulation.

In the present invention, the filler means an inorganic filler usually used in the rubber industry, such as carbon black, silica, clay, talc, calcium carbonate, magnesium carbonate, or aluminum hydroxide. Of these inorganic fillers, carbon black is in particular preferably usable in the present invention.

As carbon black, usual carbon black used in the rubber industry, such as SAF, ISAF, HAF, FEF or GPF, or electro-conductive carbon black such as acetylene black or Ketjen black can be used. Carbon black may be granulated carbon black, which is granulated considering the handleability thereof, or non-granulated carbon black, usually used in the rubber industry.

The dispersing solvent is in particular preferably water, and may be, for example, water containing an organic solvent.

The rubber latex solution may be a natural rubber latex solution or a synthetic rubber latex solution.

The natural rubber latex solution is a natural product produced by a metabolic effect of a plant, and is in particular preferably a natural-rubber/water system latex solution in which the dispersing solvent is water. About a natural rubber in the natural rubber latex solution used in the present invention, the number-average molecular weight thereof is preferably 2000000 or higher, more preferably 2500000 or higher. The synthetic rubber latex solution is, for example, a rubber latex solution in which a styrene-butadiene rubber, a butadiene rubber, a nitrile rubber, or a chloroprene rubber is produced by emulsion polymerization.

The following will describe a preferred example of the coagulating step by way of an example using carbon black as the filler, and a natural rubber latex solution as the rubber latex solution. This case makes it possible to produce a rubber wet master batch which is very high in the dispersibility of carbon black therein and which can give a vulcanized rubber further improved in low-exothermicity, durability and rubber strength. About the natural rubber latex, a concentrated latex, a fresh latex called a field latex, and the like are usable without being distinguished from each other.

In the rubber wet master batch producing method according to the present invention, it is unnecessary to use an additive for restraining a rise in the viscosity of the rubber wet master batch at an initial time of storing the rubber wet master batch, the additive being called a viscosity stabilizer. Examples of the viscosity stabilizer include hydrazide compounds such as hydrazide acetate, hydrazide propionate, hydrazide butyrate, hydrazide caproate, and cyclopropylhydrazide; hydroxylamine sulfate; semicarbazide; and dimedone (1,1-dimethylcyclohexane-3,5-dione.

(1) Step (I)

In step (I), at the time of dispersing carbon black in a dispersing solvent, at least one portion of the natural rubber latex solution is added, thereby producing a slurry solution containing carbon black to which natural rubber latex particles adhere. The natural rubber latex solution may be mixed with the dispersing solvent in advance, and then carbon black can be added to the mixture to be dispersed therein. Carbon black may be added into the dispersing solvent, and then while the natural rubber latex solution is added to the resultant at a predetermined adding speed, carbon black may be dispersed in the dispersing solvent; or carbon black may be added into the dispersing solvent, and then while the natural rubber latex solution is added to the resultant in several portions in a constant amount, carbon black may be dispersed in the dispersing solvent. By dispersing carbon black in the dispersing solvent in the state where the natural rubber latex solution is present, a slurry solution can be produced which contains carbon black to which natural rubber latex particles adhere. The amount of the natural rubber latex solution added in step (I) is, for example, from 0.075 to 12% by mass of the whole of the natural rubber latex solution to be used (the whole of the natural rubber latex solution to be added in step (I), and that to be added in step (II)).

In step (I), the solid (rubber) content in the natural rubber latex solution to be added is preferably from 0.25 to 15% by mass to the mass of carbon black, preferably from 0.5 to 6% by mass thereto. The solid (rubber) concentration in the natural rubber latex solution to be added is preferably from 0.2 to 5% by mass, more preferably from 0.25 to 1.5% by mass. In these cases, a rubber wet master batch can be produced in which the dispersion degree of carbon black is heightened while the natural rubber latex particles are certainly allowed to adhere to carbon black.

In step (I), the method for mixing carbon black and the dispersing solvent with each other in the presence of the natural rubber latex solution may be a method of using a common disperser such as a high-shearing mixer, a High Shear Mixer, a homo-mixer, a ball mill, a bead mill, a high-pressure homogenizer, an ultrasonic homogenizer or a colloid mill to disperse carbon black.

The "high-shearing mixer" means a mixer having a rotor rotatable at a high velocity and a fixed stator, in which the rotor is rotated in the state where a precise clearance is set between the rotor and the stator, whereby a high-shearing effect acts. In order to generate such a high-shearing effect, it is preferred to set the clearance between the rotor and the stator to 0.8 mm or less, and set the peripheral velocity of the rotor to 5 m/s or more. Such a high-shearing mixer may be a commercially available product. An example thereof is "High Shear Mixer" manufactured by Silverson.

When carbon black and the dispersing solvent are mixed with each other in the presence of the natural rubber latex solution in the present invention to produce the slurry solution containing carbon black to which the natural rubber latex particles adhere, a surfactant may be added thereto to improve carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol may be used. However, it is feared that the use of the surfactant makes the vulcanized rubber to be finally obtained low in rubber properties. Thus, the amount of the surfactant blended is preferably 2 parts by mass or less, more preferably 1 part by mass or less to 100 parts by mass of the solid (rubber) in the natural rubber latex solution. It is preferred not to use any surfactant substantially. An antiaging agent can be added for restraining degradation of the solid (rubber) in the natural rubber latex solution in steps (I) and (II). The antiaging agent may be an antiaging agent known in the rubber industry, and may be, for example, an amine type, phenol type, organic phosphate type, or thioether type agent.

About carbon black, to which the natural rubber latex particles adhere, in the slurry solution produced in step (I), the 90% volume particle size (μm) ("D90") is preferably 31 μm or more, more preferably 35 μm or more. In this case, carbon black in the slurry solution is excellent in dispersibility, and can be prevented from re-aggregating. Thus, the slurry solution is excellent in storage stability, and further the vulcanized rubber to be finally obtained is also excellent in low-exothermicity, durability and rubber strength. In the present invention, the D90 of the carbon black to which natural rubber latex particles adhere means a value obtained by making a measurement about carbon black plus the natural rubber latex particles adhering thereto.

(2) Step (II)

In step (II), the slurry solution and the remnant of the natural rubber latex solution are mixed with each other to produce a rubber latex solution containing the carbon black to which the natural rubber latex particles adhere. The method for mixing the slurry solution and the remnant of the rubber latex solution with each other in a liquid phase is not particularly limited, and may be a method of using a common disperser such as a high-shearing mixer, a High Shear Mixer, a homo-mixer, a ball mill, a bead mill, a high-pressure homogenizer, an ultrasonic homogenizer or a colloid mill to mix the two with each other. At the time of the mixing, the whole of the mixing system, such as the disperser, may be optionally warmed.

When the drying period in next step (III) and labors for the step are considered, the remnant of the rubber latex solution is preferably made higher in solid (rubber) concentration than the natural rubber latex solution added in step (I). Specifically, the solid (rubber) concentration is preferably from 10 to 60% by mass, more preferably from 20 to 30% by mass.

(3) Step (III)

Step (III) is a step of coagulating the rubber latex solution containing the carbon black, to which the natural rubber latex particles adhere, to produce a filler-containing rubber coagulation. The method for coagulating the solution may be, for example, a method of incorporating a coagulator into the rubber latex solution containing the carbon black, to which the natural rubber latex particles adhere, to coagulate the solution.

The coagulator used in the coagulating step may be an acid or salt usually used for coagulating a rubber latex solution, such as formic acid or sulfuric acid, or sodium chloride.

About the ratio between the rubber component and the filler in the filler-containing rubber coagulation obtained after step (III), the filler is preferably contained in an amount of 30 to 80 parts by mass to 100 parts by mass of the rubber (solid). This case makes it possible to produce finally a rubber wet master batch improved, with a good balance, in the dispersion degree of the filler therein and in the low-exothermicity and durability of any vulcanized rubber.

(Heating Step)

Figure 1:
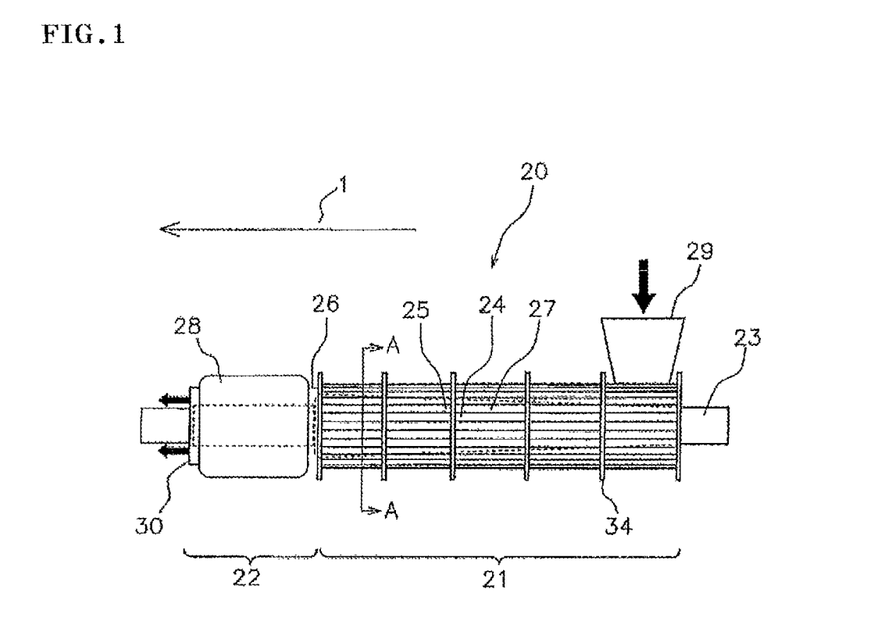
FIG. 1 is an example of an outline view of a uniaxial extruder usable in the present invention.

In the heating step, a uniaxial extruder is used to heat the filler-containing rubber coagulation to a temperature of 180 to 200° C., thereby dehydrating, drying and plasticizing the filler-containing rubber coagulation through the single step. FIG. 1 illustrates an example of the uniaxial extruder usable in the present invention.

A uniaxial extruder 20 has a screw 23, and an outer cylinder 27 including a first outer cylinder 25 positioned near a supply port 29 (at the upstream side of the extruder), and a second outer cylinder 26 positioned near a discharge port 30 (at the downstream side thereof). The filler-containing rubber coagulation obtained after the coagulating step is charged through the supply port 29, and then advanced along the longitudinal direction of the outer cylinder (the screw axial direction), which is a direction 1, while kneaded. Finally, the coagulation is discharged from the discharge port 30. A section at the upstream side is also called a dehydrating section 21; and a section at the downstream side, a drying section (expander section 22). If necessary, a jacket 28 may be fitted to the drying section 22 to adjust the temperature of the drying section 22. In the present invention, however, it is preferred that there are no pin portions projected inward from an inner wall surface of the outer cylinder in the drying section 22. If the drying section 22 has pin portions, a high shearing force acts onto the rubber component passing around the pin portions so that polymeric chains in the rubber component are cleaved. Thus, degradation of the rubber component advances easily. As a result, the vulcanized rubber to be finally obtained may be deteriorated in tearing resistance and stress characteristics at the high strain region. The screw shape of the uniaxial extruder, and the length (L) and the diameter (D) of the outer cylinder (barrel) may be those in any usual uniaxial extruder used in the rubber industry, and further the ratio of the outer cylinder length to the outer cylinder diameter (L/D) may be set at will. The screw may be a heating-type screw.

Figure 2:
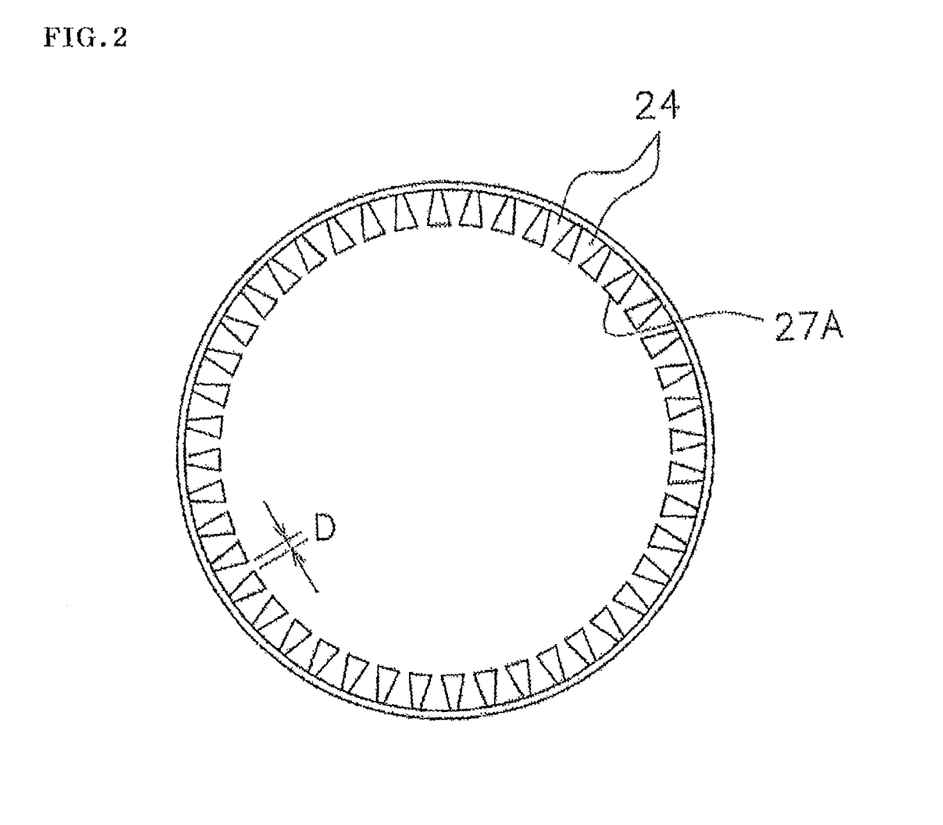
FIG. 2 is a sectional view viewed along arrows A-A in FIG. 1.
Figure 3:
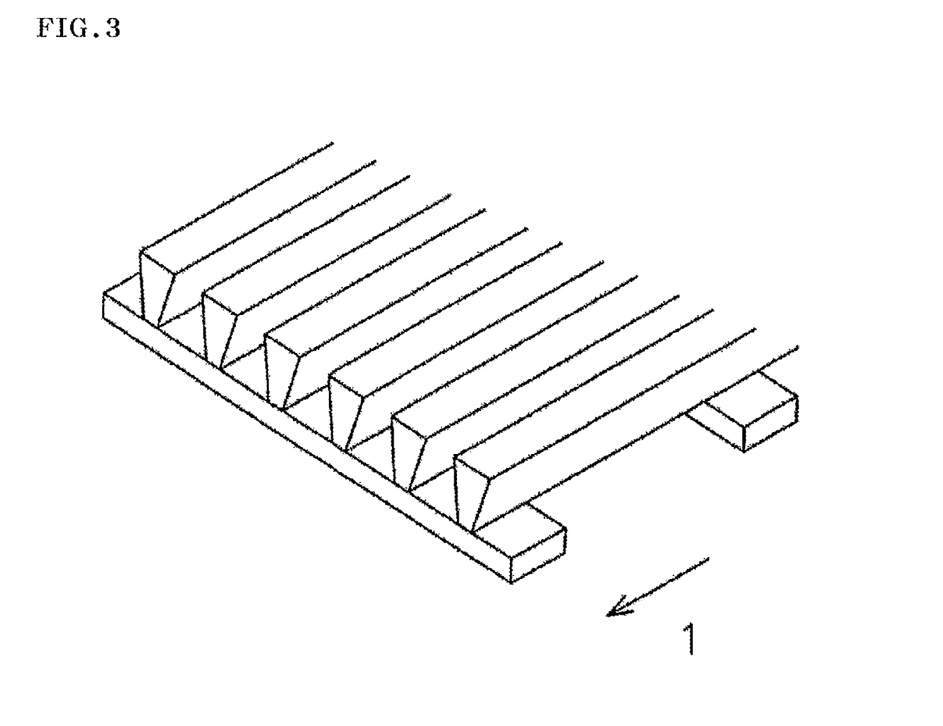
FIG. 3 is an example of a development view of an inner wall surface of an outer cylinder.

The inner wall surface of the outer cylinder 27 has at least one slit 24 extended along the longitudinal direction 1 of the outer cylinder (as illustrated in FIGS. 2 and 3, in the present embodiment, plural slits 24 are formed at regular intervals in the outer-cylinder inner-wall-surface). As illustrated in FIG. 3, the present embodiment is an example in which the slits 24 are continuously extended along the longitudinal direction 1 of the outer cylinder. However, the slits 24 may be slits extended obliquely to the longitudinal direction 1 of the outer cylinder. Furthermore, the slits 24 may be slits extended from a supply-port-29-side end of the outer cylinder 27 to a discharge-port-30-side end thereof, slits formed only inside the dehydrating section 21, or slits extended intermittently along the longitudinal direction 1 of the outer cylinder. The width D of the slits in the outer-cylinder inner-wall-surface is, for example, from 0.1 to 0.9 mm. FIG. 2 illustrates an example in which the slit width is made larger from the outer-cylinder inner-wall-surface into the depth direction of the slits. In the present invention, however, the slits formed in the outer-cylinder inner-wall-surface may be slits having a slit width kept constant from the outer-cylinder inner-wall-surface into the slit-depth direction, or may be slits having a slit width made smaller into the same direction.

At least one portion of the outer-cylinder inner-wall-surface of the uniaxial extruder is subjected to blasting treatment. Specifically, as illustrated in FIG. 2, in the outer-cylinder inner-wall-surface, its portions 27A in which the slits 24 are not formed need to be subjected to blasting treatment. In the outer-cylinder inner-wall-surface, the portions 27A, in which the slits 24 are not formed, act as a surface contacting the filler-containing rubber coagulation in the heating step. Between this blasted surface and the screw, shearing force acts onto the filler-containing rubber coagulation. As a result, in the present invention, the filler-containing rubber coagulation is effectively dehydrated, dried and plasticized through the single step. The method for the blasting treatment of the outer-cylinder inner-wall-surface may be physical polishing (shot blasting), chemical polishing (chemical corrosion) or the like, and is not particularly limited. A shooting material used in the shot blasting may be a material known by those skilled in the art, such as sand, glass, or alumina. In order to restrain the rubber from being degraded to produce a rubber wet master batch excellent in elongation at breaking and tearing resistance, the surface roughness (Ra) of the blasted surface of the outer-cylinder inner-wall-surface after the blasting treatment is preferably set into a range from 10 to 100 µm, more preferably from 20 to 60 µm.

In the rubber wet master batch producing method according to the present invention, a rubber composition can be produced by performing a kneading step and a vulcanization-related-blending-agent kneading step subsequently to the heating step, thereby blending various blending agents into the rubber wet master batch.

(Kneading Step)

The step is a step of charging, into the rubber wet master batch obtained after the heating step, a blending agent other than any vulcanization-related blending agent, and then using a mixing/dispersing machine to knead the resultant mixture, examples of the blending agent including stearic acid, zinc flower, an antiaging agent, silica, a silane coupling agent, a softener such as wax or oil, and a processing aid. In the kneading step, the blend of these blending agents with the rubber component produces the following advantageous effects: the rubber product to be obtained after vulcanization is heightened in strength; the rubber is made good in knead-processability; and the rubber is prevented from being degraded by radicals generated by the cleavage of the rubber molecular chains. Also in the kneading step, for example, a gear-engaging type Banbury mixer, a tangential line type Banbury mixer, or a kneader is usable. In particular, the use of a gear-engaging type Banbury mixer is preferred.

The antiaging agent may be an antiaging agent usually used for rubber, examples thereof including aromatic amine type, amine-ketone type, mono-phenolic type, bis-phenolic type, poly-phenolic type, dithiocarbamate type and thiourea type antiaging agents. These agents may be used alone or in the form of an appropriate mixture. The amount of the antiaging agent contained is more preferably from 0.3 to 3 parts by mass, even more preferably from 0.5 to 1.5 parts by mass to 100 parts by mass of the rubber component (solid) in the rubber wet master batch.

(Vulcanization-Related Blending Agent Kneading Step)

Vulcanization-related blending agents such as a vulcanizer such as sulfur, and a vulcanization promoter are charged into the rubber composition obtained after the kneading step, and then the whole is kneaded. When the rubber composition obtained after the vulcanization-related blending agent kneading step is heated to a predetermined temperature or higher, the vulcanizer in the rubber composition reacts with the rubber molecules to form a crosslinking structure between the rubber molecules, so that the molecules are made into a three-dimensional network. Thus, rubbery elasticity is given to the rubber composition.

Sulfur may be usual sulfur for rubber, such as powdery sulfur, precipitated sulfur, insoluble sulfur, or highly-dispersible sulfur. The sulfur content in the rubber composition according to the present invention is preferably from 0.3 to 6 parts by mass to 100 parts by mass of the rubber component. If the sulfur content is less than 0.3 parts by mass, the vulcanized rubber is insufficient in crosslinking density to be lowered in rubber strength and the like. If the sulfur content is more than 6.5 parts by mass, the vulcanized rubber is deteriorated, particularly, in both of heat resistance and durability. The sulfur content is more preferably from 1.5 to 5.5 parts by mass to 100 parts by mass of the rubber component in order for the vulcanized rubber to be made better in heat resistance and durability while ensuring rubber strength satisfactorily.

The vulcanization promoter may be a vulcanization promoter usually used for rubber vulcanization. Examples thereof include sulfenamide type vulcanization promoters, thiuram type vulcanization promoters, thiazole type vulcanization promoters, thiourea type vulcanization promoters, guanidine type vulcanization promoters, and dithiocarbamate type vulcanization promoters. These may be used alone or in the form of an appropriate mixture. The content of the vulcanization promoter is more preferably from 1 to 5 parts by mass, even more preferably from 1.5 to 4 parts by mass to 100 parts by mass of the rubber component.

EXAMPLES

Hereinafter, the present invention will be more specifically described with reference to examples thereof. Raw materials and devices used therein are as follows:

(Materials Used)

a) Carbon black:
  Carbon black "N330": "SEAST 3" (manufactured by Tokai Carbon Co., Ltd.),
  Carbon black "N110": "SEAST 9" (manufactured by Tokai Carbon Co., Ltd.), and
  Carbon black "N774": "SEAST SO" (manufactured by Tokai Carbon Co., Ltd.)

b) Dispersing solvent: water c) Rubber latex solutions:
  Latex solution obtained by adding water at normal temperature to a natural rubber concentrated latex solution manufactured by Regitex Co., Ltd. (DRC (dry rubber content)=60%; mass-average molecular weight: 236000) to adjust the rubber component concentration to 25% by mass, and
  Latex solution obtained by adding water at normal temperature to a natural rubber fresh latex solution manufactured by Golden Hope ((DRC=31.2%); mass-average molecular weight: 232000)) to adjust the rubber component concentration to 25% by mass d) Coagulator: formic acid (solution obtained by diluting a first-class 85% solution thereof into a 10% solution to adjust the pH thereof to 1.2), manufactured by Nacalai Tesque, Inc.

e) Zinc flower:
  (A) "No. 1 zinc flower", manufactured by Mitsui Mining & Smelting Co., Ltd., and
  (B) "No. 3 zinc flower", manufactured by Mitsui Mining & Smelting Co., Ltd.

f) Stearic acid, manufactured by NOF Corp.

g) Wax, manufactured by Nippon Seiro Co., Ltd.

h) Antiaging agents:
  (A) Aromatic amine agent:
N-phenyl-N'-(1,3-dimethylbutyl)-p-phenylenediamine "6PPD" (manufactured by Monsanto) having a melting point of 44° C., and
  (B) Amine ketone agent:
2,2,4-trimethyl-1,2-dihydroquinoline polymer "RD" (manufactured by Ouchi Shinko Chemical Industry Co., Ltd.) having a melting point of 80 to 100° C.

i) Sulfur:
  (A) Sulfur (manufactured by Tsurumi Chemical Industry Co., Ltd.), and
  (B) Insoluble sulfur: "OT-20" (manufactured by Akzo Nobel)

j) Vulcanization promoters:
  (A) "CBS" (manufactured by Sanshin Chemical Industry Co., Ltd.), and
  (B) N,N-dicyclohexylbenzothiazole-2-sulfenamide, "NOCCELER DZ" (manufactured by Ouchi Shinko Chemical Industry Co., Ltd.)

k) Boron-containing organic acid cobalt salt: "MANOBOND C680C" (manufactured by OMG)

l) Resorcin-alkylphenol-formalin resin: "SUMIKANOL 620" (manufactured by Sumitomo Chemical Co., Ltd.)

m) Hexamethoxymethylmelamine: "CYLETS 963L" (manufactured by Mitsui Cytex, Ltd.)

n) Additional rubber: high-cis polybutadiene rubber, "BR150L" (manufactured by Ube Industries, Ltd.)

(Evaluation)

Evaluation was made about a rubber obtained by using a predetermined mold to heat and vulcanize each rubber composition at 150° C. for 30 minutes.

(Moisture Content in Filler-Containing Rubber Coagulation)

In accordance with JIS K6238-2, the moisture content was measured using a heat-drying type moisture meter MX-50 manufactured by A & D Co., Ltd.

(Moony Viscosity of Rubber Wet Master Batch)

In accordance with JIS K6300, the viscosity of each rubber wet master batch was measured at 100° C. For the evaluation thereof, the viscosity was converted to an index relative to the viscosity of Comparative Example 1, which was regarded as 100, and was then evaluated on the basis of the index. As the resultant numerical value was lower, the rubber wet master batch was further plasticized and better.
(Surface Roughness (Ra) of Blasted Surface)

In accordance with JIS B0601, a laser microscope (Super Depth Profile Measurement Microscope VK-8500 (manufactured by Keyence Corp.)) was used to observe 10 points extracted at random on a metallic surface, and then the surface roughness of each of the points was measured through an image measurement analysis software (VK-H1W (many Keyence Corp.)). The average of the roughnesses was calculated to determine the arithmetic average surface roughness (Ra) of the blasted surface.
(Elongation of Vulcanized Rubber at Breaking)

In accordance with JIS-K 6251, a JIS #3 dumbbell was used to prepare each sample for evaluation. The elongation thereof at breaking was measured. For the evaluation thereof, about Examples 1 to 2, and Comparative Examples 1 to 5, the measured value of Comparative Example 1 was regarded as 100, and the value of each of the examples was represented as an index relative thereto. About Examples 3 and 4, the measured value of Comparative Example 6 was regarded as 100, and the value of each of the examples was represented as an index relative thereto. About Example 5, the measured value of Comparative Example 7 was regarded as 100, and the value of Example 5 was represented as an index relative thereto. As the numerical value is higher, a rubber composition is further prevented from being rubber-degraded when produced, so that the composition is more excellent in rubber physical properties.
(Tearing Resistance)

In accordance with JIS K6252, each sample for evaluation was prepared. The tearing resistance was measured. For the evaluation thereof, about Examples 1 to 2, and Comparative Examples 1 to 5, the measured value of Comparative Example 1 was regarded as 100, and the value of each of the examples was represented as an index relative thereto. About Examples 3 and 4, the measured value of Comparative Example 6 was regarded as 100, and the value of each of the examples was represented as an index relative thereto. About Example 5, the measured value of Comparative Example 7 was regarded as 100, and the value of Example 5 was represented as an index relative thereto. As the numerical value is higher, the sample is more excellent in tearing resistance.

Example 1

To a diluted latex solution of a natural rubber, the concentration thereof being adjusted to 0.5% by mass, were added 70 parts by mass of carbon black (the solid (rubber) content in the latex solution was 1 part by mass, this amount being a proportion relative to the mass of carbon black). A device, ROBOMIX, manufactured by Primix Corp., was used to disperse carbon black therein (ROBOMIX conditions: rotation at 9000 rpm for 30 minutes) to produce a slurry solution containing carbon black to which natural rubber latex particles adhered (step (I)).

Next, to the slurry produced in step (I), which contained the carbon black to which the natural rubber latex particles adhered, was added the remnant of the natural rubber concentrated latex solution (the solid (rubber) concentration therein was adjusted to 25% by mass by the addition of water), so as to adjust the total of the solid (rubber) content therein and that in the natural rubber latex solution used in step (I) to 100 parts by mass. Thereafter, a mixer for household use, model SM-L56, manufactured by Sanyo Electric Co., Ltd. was used to mix these components with each other (mixer conditions: rotation at 11300 rpm for 30 minutes) to produce a natural rubber latex solution containing the carbon black to which the natural rubber latex particles adhered (step (II)).
(Coagulating Step)

A 10% by mass aqueous formic acid solution as a coagulator was added to the natural rubber latex solution produced in step (II), which contained the carbon black to which the natural rubber latex particles adhered, until the pH of the whole turned to 4. In this way, a natural rubber coagulation containing the carbon black was produced (step (III)).
(Heating Step)

Using a squeezer type uniaxial extruder illustrated in FIGS. 1 to 3 (article number: V-02, manufactured by Suehiro EPM Corp.; barrel diameter: 90 mm; "barrel length"/"barrel diameter" (L/D)=8.6; surface roughness (Ra) of its blasted surface 27A: 34 μm; and widths D of slits made in its outer-cylinder inner-wall-surface: 0.7 mm. 0.5 mm, and 0.2 mm), the natural rubber coagulation was dehydrated, dried, and plasticized through a single step while kneaded at a heating temperature of 200° C. (heating temperature of its heating-type screw: 200° C.). The blasting treatment of the outer-cylinder inner-wall-surface 27A was conducted by treating the surface with alumina particles having a diameter of 0.8 mm at a blasting pressure of 0.4 MPa.
(Kneading Step and Vulcanization-Related Blending Agent Kneading Step)

A B-type Banbury mixer (manufactured by Kobe Steel Ltd.) was used to blend various additives described in Table 1 into the resultant natural rubber wet master batch to prepare a rubber composition. Physical properties of a vulcanized rubber therefrom were measured. The results are shown in Table 1.

Examples 2 to 5

A natural rubber wet master batch, a rubber composition and a vulcanized rubber were produced in the same way as in Example 1 except that the type of carbon black used, the heating temperature in the heating step, and the types and blending amounts of the various additives were changed.

Comparative Example 1

A natural rubber wet master batch, a rubber composition and a vulcanized rubber were produced in the same way as in Example 1 except that instead of the heating step, the following two steps were performed, and no blasting treatment was applied to the outer-cylinder inner-wall-surface of the uniaxial extruder used in these steps: a dehydrating step (dehydrating temperature (temperature of the heating-type screw of the uniaxial extruder used in dehydrating): 160° C.); and a drying and plasticizing step (drying and plasticizing temperature (temperature of the heating-type screw of the uniaxial extruder used in drying and plasticizing): 160° C.). Physical properties of the vulcanized rubber are shown in Table 1.

Comparative Examples 6 and 7

A natural rubber wet master batch, a rubber composition and a vulcanized rubber were produced in the same way as in Comparative Example 1 except that the type of carbon black used, and the types and blending amounts of the various additives were changed.

Comparative Examples 2 and 3

A natural rubber wet master batch, a rubber composition and a vulcanized rubber were produced in the same way as in Example 1 except that no blasting treatment was applied to the outer-cylinder inner-wall-surface of the uniaxial extruder used in the heating step. Physical properties of the vulcanized rubber are shown in Table 1.

Comparative Examples 4 and 5

A natural rubber wet master batch, a rubber composition and a vulcanized rubber were produced in the same way as in Example 1 except that the heating temperature in the heating step was changed. Physical properties of the vulcanized rubber are shown in Table 1.

TABLE 1A

| | (Formulation) | | Comparative Example 1 | Comparative Example 2 | Comparative Example 3 | Comparative Example 4 | Comparative Example 5 | Example 1 | Example 2 |
|---|---|---|---|---|---|---|---|---|---|
| Rubber wet master batch blending-components | Carbon black | N774 | 70 | 70 | 70 | 70 | 70 | 70 | 70 |
| | | N330 | — | — | — | — | — | — | — |
| | | N110 | — | — | — | — | — | — | — |
| | Natural rubber (solid) | | 100 | 100 | 100 | 100 | 100 | 100 | 100 |
| Blending components in production of rubber composition | Additional rubbers | | — | — | — | — | — | — | — |
| | Zinc flower | (A) | 3 | 3 | 3 | 3 | 3 | 3 | 3 |
| | | (B) | — | — | — | — | — | — | — |
| | Stearic acid | | 1 | 1 | 1 | 1 | 1 | 1 | 1 |
| | Wax | | 1 | 1 | 1 | 1 | 1 | 1 | 1 |
| | Antiaging agents | (A) | 2 | 2 | 2 | 2 | 2 | 2 | 2 |
| | | (B) | — | — | — | — | — | — | — |
| | Sulfur | (A) | 2 | 2 | 2 | 2 | 2 | 2 | 2 |
| | | (B) | — | — | — | — | — | — | — |
| | Vulcanization promoters | (A) | 1 | 1 | 1 | 1 | 1 | 1 | 1 |
| | | (B) | — | — | — | — | — | — | — |
| | Boron-containing organic acid cobalt salt | | — | — | — | — | — | — | — |
| | Resorcin-alkylphenol-formalin resin | | — | — | — | — | — | — | — |
| | Hexamethoxymethylmelamine | | — | — | — | — | — | — | — |

TABLE 1B

| | | | Comparative Example 6 | Example 3 | Example 4 | Comparative Example 7 | Example 5 |
|---|---|---|---|---|---|---|---|
| | (Formulation) | | | | | | |
| Rubber wet master batch blending-components | Carbon black | N774 | — | — | — | — | — |
| | | N330 | 60 | 60 | 60 | — | — |
| | | N110 | — | — | — | 50 | 50 |
| | Natural rubber (solid) | | 100 | 100 | 100 | 80 | 80 |
| Blending components in production of rubber composition | Additional rubbers | | — | — | — | 20 | 20 |
| | Zinc flower | (A) | — | — | — | 3 | 3 |
| | | (B) | 8 | 8 | 8 | — | — |
| | Stearic acid | | — | — | — | 2 | 2 |
| | Wax | | — | — | — | 1 | 1 |
| | Antiaging agents | (A) | 2 | 2 | 2 | 2 | 2 |
| | | (B) | — | — | — | 1 | 1 |
| | Sulfur | (A) | — | — | — | 2 | 2 |
| | | (B) | 4.5 | 4.5 | 4.5 | — | — |
| | Vulcanization promoters | (A) | — | — | 1 | 1 | |
| | | (B) | 1 | 1 | 1 | — | — |
| | Boron-containing organic acid cobalt salt | | 0.8 | 0.8 | 0.8 | — | — |
| | Resorcin-alkylphenol-formalin resin | | 2 | 2 | 2 | — | — |
| | Hexamethoxymethylmelamine | | 4 | 4 | 4 | — | — |

TABLE 1C

| | Comparative Example 1 | Comparative Example 2 | Comparative Example 3 | Comparative Example 4 | Comparative Example 5 | Example 1 | Example 2 |
|---|---|---|---|---|---|---|---|
| (Heating step conditions) | | | | | | | |
| Heating temperature (heating-type screw temperature) | — | 200 | 220 | 160 | 220 | 200 | 180 |
| Blasting treatment at convex region of outer cylinder of uniaxial extruder | — | Not conducted | Not conducted | Conducted | Conducted | Conducted | Conducted |
| Water content (%) in carbon-black-containing rubber coagulation | — | 1.31 | 0.48 | 4.31 | 0.13 | 0.53 | 0.86 |

TABLE 1C-continued

|  | Comparative Example 1 | Comparative Example 2 | Comparative Example 3 | Comparative Example 4 | Comparative Example 5 | Example 1 | Example 2 |
|---|---|---|---|---|---|---|---|
| (Dehydrating step conditions) | | | | | | | |
| Dehydrating temperature (heating-type screw temperature) | 160 | — | — | — | — | — | — |
| Blasting treatment at convex region of outer cylinder of uniaxial extruder | Not conducted | — | — | — | — | — | — |
| Water content (%) in carbon-black-containing rubber coagulation | 9.7 | — | — | — | — | — | — |
| (Drying and plasticizing step conditions) | | | | | | | |
| Drying and plasticizing temperature (heating-type screw temperature) | 160 | — | — | — | — | — | — |
| Blasting treatment at convex region of outer cylinder of uniaxial extruder | Not conducted | — | — | — | — | — | — |
| Water content (%) in carbon-black-containing rubber coagulation | 0.98 | — | — | — | — | — | — |
| (Rubber wet master batch physical properties) | | | | | | | |
| Void volume proportion (%) | 8.6 | 10.4 | 4.7 | 26.3 | 3.7 | 6 | 8.8 |
| Moony viscosity (INDEX) | 100 | 108 | 90 | 123 | 78 | 86 | 90 |
| (Vulcanized rubber physical properties) | | | | | | | |
| Elongation at breaking (INDEX) | 100 | 98 | 93 | — | 84 | 104 | 109 |
| Tearing resistance (INDEX) | 100 | 99 | 84 | — | 76 | 108 | 116 |

TABLE 1D

|  | Comparative Example 6 | Example 3 | Example 4 | Comparative Example 7 | Example 5 |
|---|---|---|---|---|---|
| (Heating step conditions) | | | | | |
| Heating temperature (heating-type screw temperature) | — | 200 | 180 | — | 200 |
| Blasting treatment at convex region of outer cylinder of uniaxial extruder | — | Conducted | Conducted | — | Conducted |
| Water content (%) in carbon-black-containing rubber coagulation | — | 0.43 | 0.79 | — | 0.58 |
| (Dehydrating step conditions) | | | | | |
| Dehydrating temperature (heating-type screw temperature) | 160 | — | — | 160 | — |
| Blasting treatment at convex region of outer cylinder of uniaxial extruder | Not conducted | — | — | Not conducted | — |
| Water content (%) in carbon-black-containing rubber coagulation | 5 | — | — | 4.12 | — |
| (Drying and plasticizing step conditions) | | | | | |
| Drying and plasticizing temperature (heating-type screw temperature) | 160 | — | — | 160 | — |
| Blasting treatment at convex region of outer cylinder of uniaxial extruder | Not conducted | — | — | Not conducted | — |
| Water content (%) in carbon-black-containing rubber coagulation | 0.81 | — | — | 0.83 | — |
| (Rubber wet master batch physical properties) | | | | | |
| Void volume proportion (%) | 6.7 | 3.5 | 6 | 3.6 | 2.2 |
| Moony viscosity (INDEX) | 100 | 90 | 93 | 100 | 92 |
| (Vulcanized rubber physical properties) | | | | | |
| Elongation at breaking (INDEX) | 100 | 106 | 112 | 100 | 104 |
| Tearing resistance (INDEX) | 100 | 105 | 110 | 100 | 105 |

According to the results in Table 1A and 1B, the rubber wet master batches according to Examples 1 to 5 were far lower in moisture content, only through the single step, which was the heating step, than the rubber wet master batches according to Comparative Examples 1, 6 and 7. It is also understood that the former rubber wet master batches were also lower in Moony viscosity and thus the master batches were sufficiently plasticized. Furthermore, it is also understood that when the former rubber wet master batches were each made into the vulcanized rubber, the rubber was improved in elongation at breaking and tearing resistance. However, the rubber wet master batch according to Comparative Example 2 was produced, using the uniaxial extruder having the outer-cylinder inner-wall-surface subjected to no blasting treatment, so as to be high in moisture content after the heating step. Thus, it is understood that the master batch was insufficiently plasticized. The rubber wet master batch according to Comparative Example 3 was produced while the heating temperature was raised to 220° C., which was higher than in Comparative Example 2. Thus, it is understood that although the rubber wet master batch according to Comparative Example 3 was low in moisture content and thus was sufficiently plasticized, the rubber component therein was degraded by the high-temperature treatment so that the vulcanized rubber was deteriorated in elongation at breaking and tearing resistance.

In Comparative Example 4, the heating temperature was low. Thus, the rubber wet master batch according to this example was very high in moisture content and thus the master batch was insufficiently plasticized. As a result, in the kneading step, the rubber wet master batch failed in being kneaded, so that physical properties of no vulcanized rubber therefrom were measurable. Furthermore, in Comparative Example 5, the heating temperature was high. Thus, it is understood that in the rubber wet master batch according to this example, the rubber component was degraded by the high-temperature treatment, so that the vulcanized rubber was deteriorated in elongation at breaking and tearing resistance.

The invention claimed is:

1. A method for producing a rubber wet master batch obtained by using at least a filler, a dispersing solvent, and a rubber latex solution as raw materials, comprising:
    a coagulating step of mixing a slurry solution containing the filler and the dispersing solvent with the rubber latex solution, and coagulating the mixture, thereby producing a filler-containing rubber coagulation; and
    a heating step of using a uniaxial extruder to heat the filler-containing rubber coagulation to a temperature of 180 to 200° C., thereby dehydrating, drying and plasticizing the filler-containing rubber coagulation through a single step,
    wherein: the uniaxial extruder is an extruder having a screw, and an outer cylinder having an inner wall surface in which a slit is formed to be extended along the longitudinal direction of the outer cylinder (screw axial direction); and at least one portion of the inner wall surface of the outer cylinder is subjected to blasting treatment.

2. The method for producing a rubber wet master batch according to claim 1, wherein the blasted surface of the inner wall surface of the outer cylinder has a surface roughness (Ra) of 10 to 100 μm.

* * * * *